Dec. 6, 1966    J. H. MEYER    3,289,981
LAND AND AIR TRANSPORTATION SYSTEM
Filed Oct. 5, 1964    3 Sheets-Sheet 1

INVENTOR.
Joseph H. Meyer
by
ATTORNEYS.

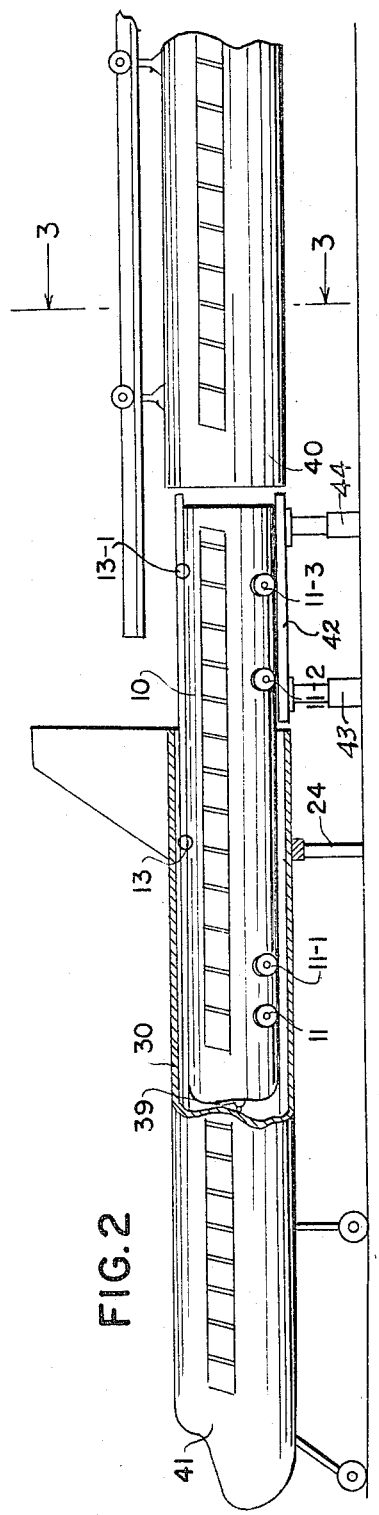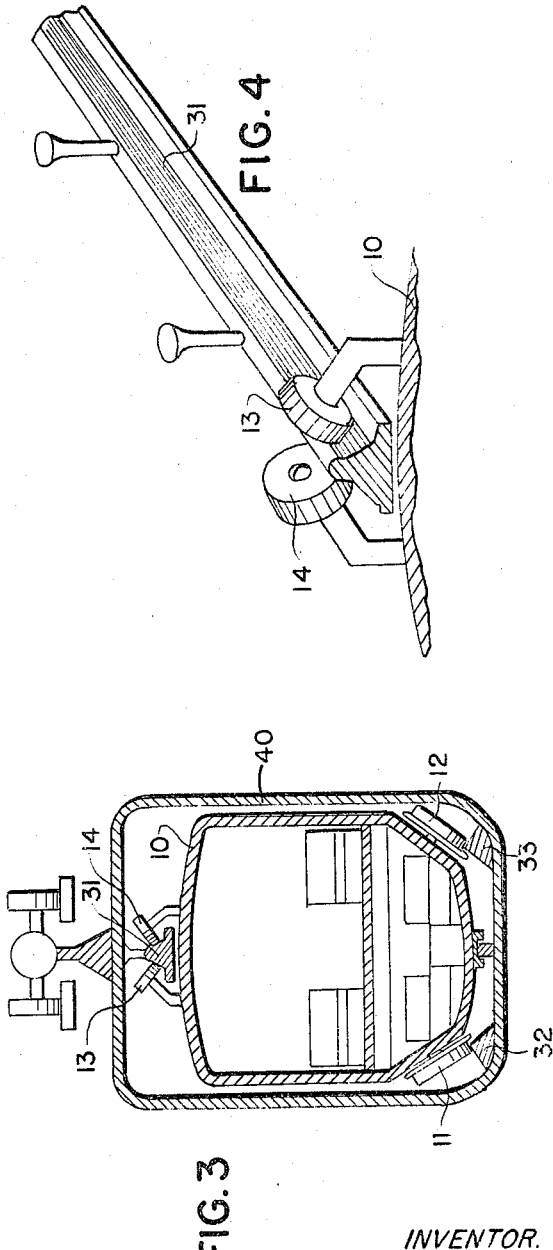

Dec. 6, 1966    J. H. MEYER    3,289,981
LAND AND AIR TRANSPORTATION SYSTEM
Filed Oct. 5, 1964    3 Sheets-Sheet 3
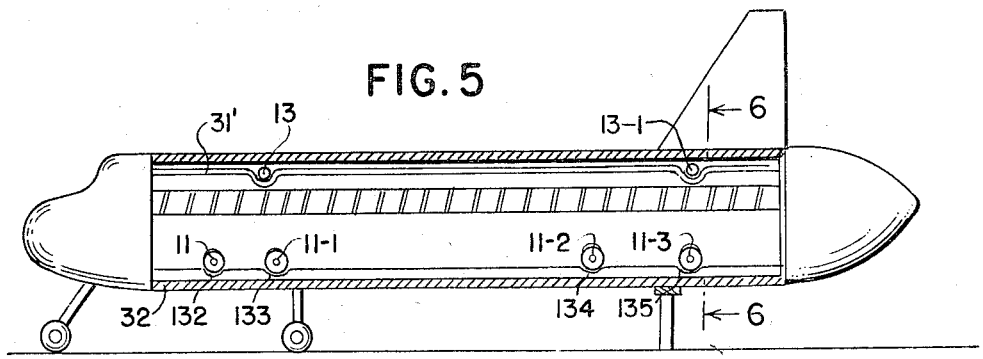
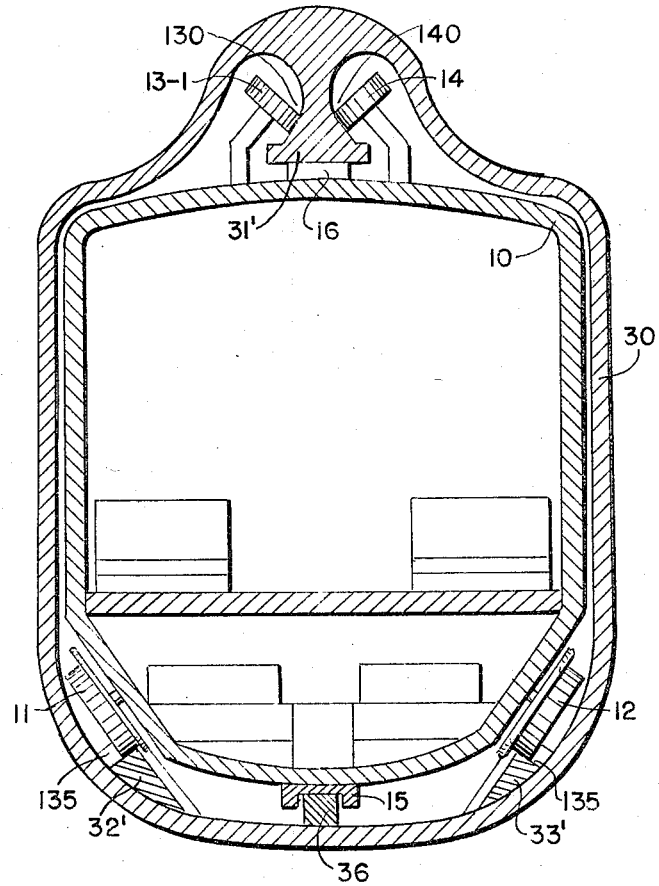
INVENTOR.
Joseph H. Meyer
by *greene & durr*
ATTORNEYS.

United States Patent Office 3,289,981
Patented Dec. 6, 1966

3,289,981
LAND AND AIR TRANSPORTATION SYSTEM
Joseph H. Meyer, 56 Dogwood Lane,
Rockville Centre, N.Y.
Filed Oct. 5, 1964, Ser. No. 401,347
3 Claims. (Cl. 244—137)

This invention relates to a transport capsule especially useful for the transportation of passengers and/or large amounts of freight by air and by land or sea.

Among objects of the invention is to provide a passenger and/or freight carrying capsule adapted to be inserted into land, sea or air craft and to be transferred from a land based craft to an airplane, etc.

Among other objects of the invention is to provide a capsule adapted to carry passengers and/or large amounts of freight which can be loaded with the passengers and/or freight at one area, transported to an airport, and inserted in an airplane at the airport whereupon the airplane is ready for takeoff.

The objects of the invention are obtained by providing a capsule, having roller means, complete with freight compartments and/or passenger seats, in combination with an airplane having a shell-like fuselage containing tracks running lengthwise thereof along which the capsule can move by means of said roller means. Connecting tracks for the rollers outside of said fuselage shell are provided to connect to the tracks within the fuselage. The shell-like fuselage is provided with an end portion which can be opened and closed to admit and lock in the capsule. Auxiliary transporting shells provided with monorail locomotion means are preferably also provided. In the specification and claims, the term cargo will be understood to include both passengers and freight.

The above cited objects together with other objects and advantages of the invention will be more fully understood when read in connection with the accompanying drawing in which:

FIG. 2 is a side view partly in cross section showing the step of loading an airplane fuselage shell from a monorail shell according to the present invention.

FIG. 3 is a cross sectional view taken on line 3—3 of FIG. 2.

FIG. 4 is a perspective detail view of the internal track of the shell of a monorail like that of FIG. 2.

FIG. 5 is a side view, partly in cross section of an airplane loaded with a cargo capsule in accordance with the present invention.

FIG. 6 is a cross sectional view taken on line 6—6 of FIG. 5.

Figure 1:
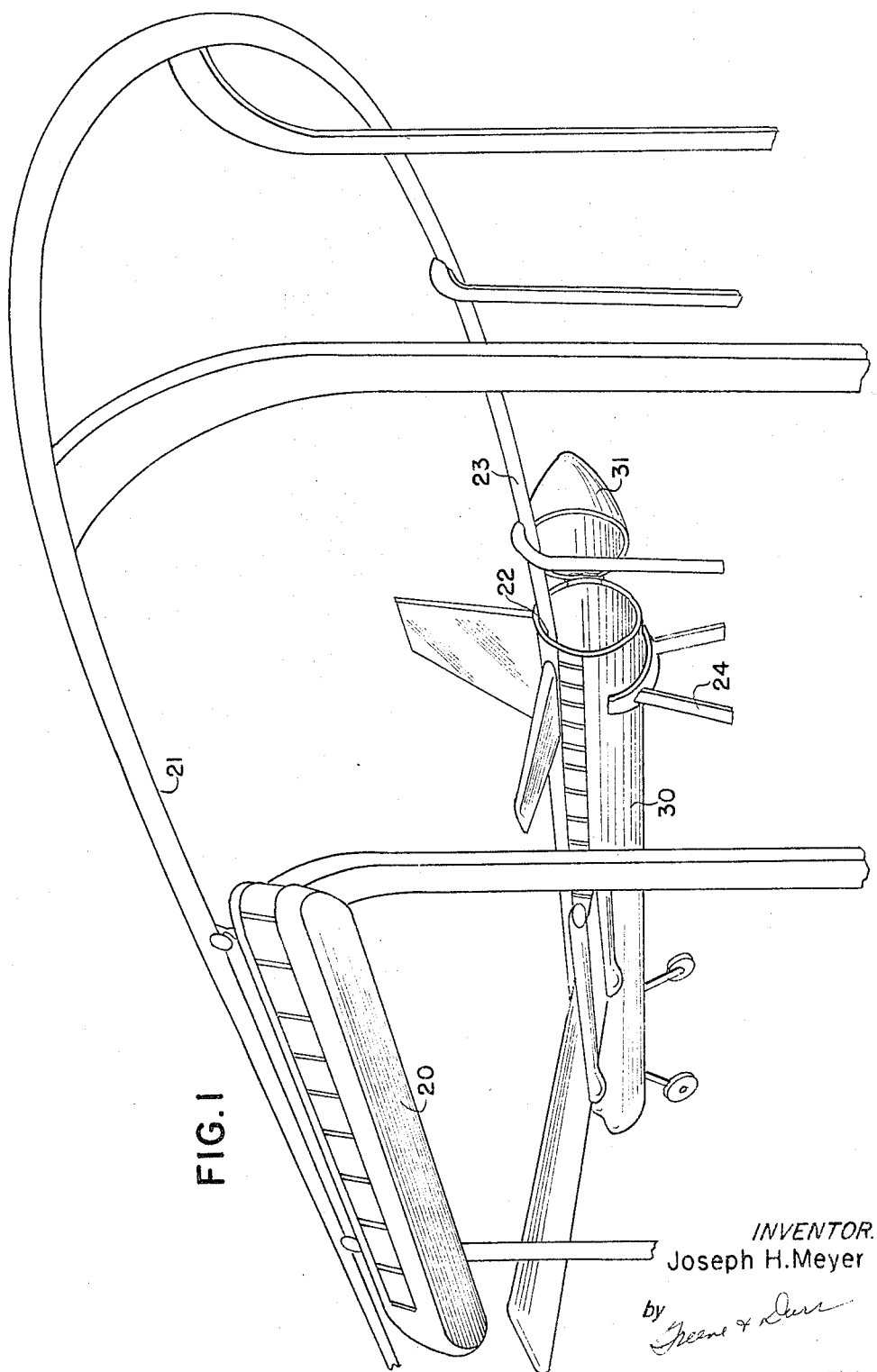
FIG. 1 is a perspective view of a transportation system embodying the invention.

FIG. 1 illustrates an idealized form of the invention wherein the monorail car 20, previously loaded with cargo and running on track 21 is connected directly with a monorail track 22 (forming part of the frame structure of the airplane fuselage 30) by the connection 23. The rear end 31 of the airplane fuselage 30 is opened and the plane is supported by means 24 in proper position for being loaded. Thus, the capsule 20 having its own monorail system of locomotion moves directly into the fuselage shell 30 and when in position is clamped in place within said fuselage 30.

Since the capsule itself can be made more economically if it does not have to include all the structure necessary to make it resistant to the strains incidental to the locomotion thereof and to the use of the structure by itself as a separate unitary conveying means, it is preferred to provide a capsule, such as shown in FIGS 2–6, which fits within the shell of a monorail car or similar ground transportation car as well as within the shell of an airplane fuselage. As shown in FIG. 2 the capsule 10 can be transferred from the monorail shell 40 directly to the fuselage shell 30. The capsule 10 has lower wheels 11 to 11–3 on one side and corresponding lower wheels 12 on the opposite side. The wheels have axles suitably journaled in bearings held in casing 10. The wheels 11 and 12 toe-in towards each other as shown (the angle being somewhat exaggerated to emphasize the structure) so as to increase the stability of the capsule against transverse movement. Sets of top roller supports 13, 13–1, 14 also support the frame or casing 10 from above. Rollers 13 and 14 are also positioned with their axes at an angle to each other to increase the stability against transverse motion. The two pairs of opposed roller sets provide multiple supports for the capsule 10 within the fuselage 30 which prevent any substantial transverse movement of the capsule 10 while the plane is in flight regardless of how the fuselage is pivoted during turning of the airplane, etc. The interior of the monorail capsule 40 is provided with the top rail 31 on which the rollers 13 and 14 are guided and the bottom rails 32 and 33 on which rollers or wheels 11 and 12 are guided. Corresponding guide rails are provided in the fuselage as shown in FIG. 6.

As illustrated in FIGS. 2 and 5 the wheels 11, 11–1, 11–2 and 11–3 and rollers 13 and 13–1 (as well as 14 and 14–1 not shown) are unsymmetrically spaced along the length of the capsule. The tracks 32' and 33' contain depressions corresponding in number to the number of wheels 11 on the capsule as shown at 132, 133, 134 and 135 onto which the wheels 11, 11–1, 11–2 and 11–3 are adapted to fit. The rail 31 contains corresponding depressions 130, 140 onto which rollers 13 and 14 are adapted to fit. The depressions 132, 133, 134, 135 and 130 and 140 are so arranged along the rails 32', 33' and 31' that all of the unsymmetrically positioned wheels 11 to 11–3, 13, 14, etc., fit therein only when the capsule 10 is in its proper final position within the fuselage 30. Thus, no roller or wheel will roll into a depression made for one of the other wheels or rollers during the process of moving the capsule in or out of the fuselage.

The lower center portion of the shell 30 is provided with a track 36 above which channel member 15 of the capsule 10 is adapted to move. When the capsule wheels 11, 12, etc., and rollers 13, 14 etc., finally settle into their respective grooves, the channel member 15 fits sungly over track 36. Two or more wedged clamps 16 may be positioned between the lower edge of track 31 and the upper part of frame 10. As shown, the clamps 16 are manually applied from inside the cabin of capsule 10, but such clamps can be arranged to operate mechanically. Additional clamps may be provided between the upper sides of wheels 11 and 12 and the shell 30. The capsule 10 may be drawn into the fuselage 30 by means of a cable 39 attached to the front of shell 10 and drawn by a winch or smaller device (not shown) contained in the nose and front portion of the fuselage where the other mechanical parts of the plane are located. A similar device in the shell 40 may be employed for removing the capsule 10.

The nose and front part 41 of the airplane which contains the mechanical and control parts of the airplane (not shown in detail) is also fitted with plug-in connections to the capsule such as electricity, heat, air conditioning, oxygen pressure, radio and public address systems, etc.

A transfer table 42 supported on adjustable columns 43 and 44 may be provided as shown in FIG. 2.

The features and principles underlying the invention described above in connection with specific exemplifications will suggest to those skilled in the art many other modifications thereof. It is accordingly desired that the appended claims shall not be limited to any specific feature or details thereof.

I claim:

1. In a system of land and air transportation, a capsule means adapted to carry cargo in combination with a land transportation device and an airplane having a shell-like fuselage that can be opened at the tail end thereof, said capsule having roller means adapted to support it from above for movement on a monorail, said fuselage shell having monorail means suspended from the top portion thereof whereby said capsule can be moved into said fuselage shell, additional roller means mounted on the lower portion of said capsule, and track means corresponding to said additional roller means extending along said fuselage shell to further guide said capsule in its movement into said fuselage shell, said land transportation device having a shell portion of a length and cross sectional size adapted to surround said capsule, monorail track means attached to the top portion of said shell of the land transportation device and additional track means on the lower portion of said shell whereby said capsule may be transferred from one of the fuselage shells and the land device shell to the other.

2. In a system of land and air transportation, a capsule means adapted to carry cargo in combination with an airplane having a shell-like fuselage which can be opened at the tail end thereof, said capsule having rollers means adapted to support it from above for movement on a monorail, said fuselage shell having monorail means suspended from the top portion thereof whereby said capsule can be moved into said fuselage shell, additional roller means mounted on the lower portion of said capsule, and track means corresponding to said additional roller means extending along said fuselage shell to further guide said capsule in its movement into said fuselage shell, said capsule containing a plurality of said monorail rollers and a plurality of said lower roller means, said lower rollers being present as pairs of rollers on opposite sides of said capsule, the individuals of each pair of rollers being rotatably mounted so that the rollers toe inwardly toward each other.

3. A system as claimed in claim 2 wherein said plurality of monorail rollers and said pairs of lower rollers are unsymmetrically spaced with respect to each other, said monorail tracks and said lower tracks containing dips therein of a configuration to fit the rollers which move on said tracks, said dips being positioned along said tracks to receive all of the rollers when and only when said capsule is completely enclosed in said fuselage shell.

References Cited by the Examiner
UNITED STATES PATENTS
2,367,538   1/1945   Sullivan _____ 244—137

FOREIGN PATENTS
167,068   8/1921   Great Britain.

MILTON BUCHLER, *Primary Examiner.*
ALFRED E. CORRIGAN, *Examiner.*